UNITED STATES PATENT OFFICE.

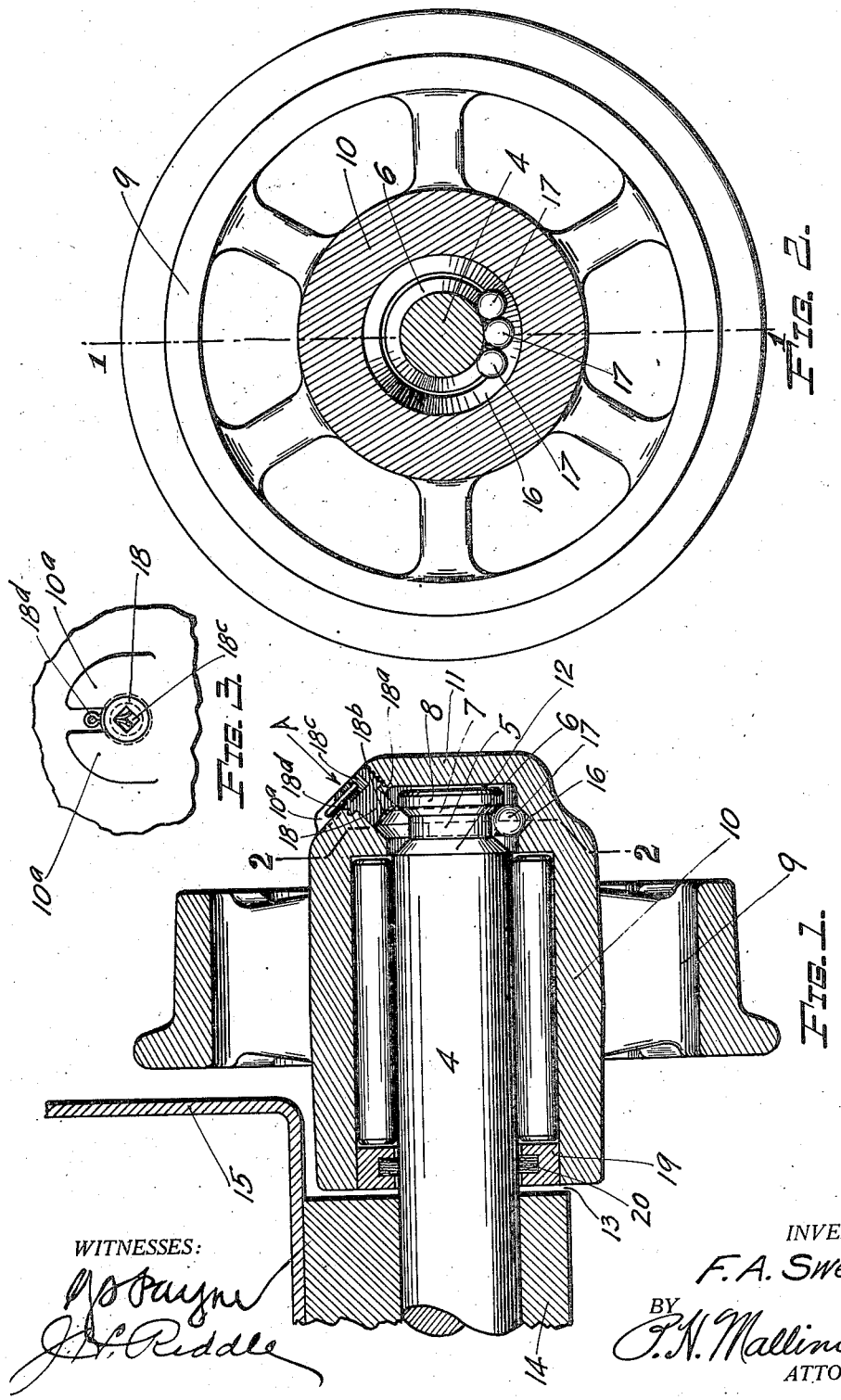

FREDERICK A. SWEET, OF SALT LAKE CITY, UTAH.

MINE-CAR WHEEL AND AXLE.

1,141,990.

Specification of Letters Patent. Patented June 8, 1915.

Application filed November 28, 1914. Serial No. 874,383.

*To all whom it may concern:*

Be it known that I, FREDERICK A. SWEET, a citizen of the United States, and a resident of Salt Lake City, in the county of Salt Lake and the State of Utah, have invented certain new and useful Improvements in Mine-Car Wheels and Axles, of which the following, together with the accompanying drawings, constitute a full, clear, and exact specification, which will enable others skilled in the art to which the invention appertains to make and use the same.

My invention relates to mine car wheels and axles, and its object is to securely hold the wheel on the axle with a minimum of friction between the wheel hub and the axle fastening.

Further objects are to provide a reservoir for grease, means for readily allowing the injection of grease into the reservoir and means for retaining the grease without leakage.

The features upon which I desire protection are summarized in the appended claims.

In the drawings, Figure 1, shows a section of my improved wheel with a part of the axle in elevation, the section being taken on the line 1—1 in Fig. 2, and showing also a part of the car body. Fig. 2 is a side elevation of the wheel, with the hub taken in section on the line 2—2 in Fig. 1. Fig. 3 is a fragmentary view looking in the direction of the arrow "A" in Fig. 1, and shows a detail.

While the drawings illustrate a wheel of the ordinary roller-bearing type, my invention is also applicable to wheels of many different designs.

Referring to the drawings, (4) represents the shank of the axle and has near its outer extremity a groove serving as a ball race, and formed by the cylindrical neck (5) and the conical surfaces (6) and (7), the axle terminating in the knob (8). Mounted on the axle, is the wheel (9) having the bore of its hub (10) closed at the outer end by the head (11), integral therewith. In the term "head" I choose to include the entire front portion of the hub lying beyond the actual axle bearing. The head (11) is counterbored to receive the end of the axle and on its inner circumference has the V-groove (16) registering with the ball race in the axle. The balls (17), which are preferably made of steel, and of which there may be any suitable number, serve to retain the wheel on the axle, by virtue of the inner face of groove (16) bearing through the balls (17) against the conical surface (7). The balls (17) are dropped into the ball race through a circular opening in the hub (10), normally closed by the threaded plug (18). The plug (18) is set with its center line perpendicular to the tangent plane passing through an element of the outer conical surface of the groove (16). The upper part of the plug (18) is threaded, and at (18ª) has a shoulder which bears on a corresponding seat formed in the hub (10). The body of plug (18) extends downward from the shoulder (18ª) and its lower face is concaved or "cupped" as shown at (18ᵇ). The radius of the concavity (18ᵇ) should be sufficient to form the continuation of the tangent circle lying in the outer conical surface of the groove (16) and passing through the points contacted by the balls (17). The shoulder (18ª) serves to make a grease tight joint and at the same time forms a stop so that the concave surface (18ᵇ) can always be brought to the same position relatively to the raceway (16). In its upper surface, plug (18) has the square countersunk hole (18ᶜ) to be engaged by a corresponding wrench for screwing it in, and for unscrewing it, and (18ᵈ) is a split key whose ends are expansible and which is guarded on each side by a projection (10ª) on the hub (10) thus preventing the plug (18) from becoming unscrewed accidentally due to the vibration of the wheel when it is in motion.

The entire vacant space on the inside of hub (10) and around the axle (4) forms a reservoir for grease, which may be filled by removing plug (18) and the grease may be effectually retained therein by the ring (19) which is tightly pressed into the bore of the hub and which is closely packed around the axle, preferably with felt.

It will be noticed in Fig. 1, that the space (12) between the knob (8) and the inside face of the head (11) is less than the space (13) between the hub (10) and the sleeve (14) which latter is rigidly attached to the car body (15). It will be noticed also that the space between the balls (17) and the conical surface (6) is considerably greater than the space (12). This arrangement, in operation, compels all the thrust of the axle against the wheel hub to be taken up, first, in the outward direction, by the bearing of the end of the axle against the inner face of the head (11) and, second, in the inward direction, (when going through frogs and switches) by the bearing through the balls (17) of the conical surface (7) against the inner conical surface of the groove (16). Furthermore, the weight of the car, transmitted through the axle is taken up entirely in the bore of the wheel, thus allowing a free and unimpaired rotation of the wheel on the axle, so far as concerns the axle fastening, or hub-retaining, device.

Having fully described my invention what I claim as new, is:

1. In combination, a wheel hub comprising a bored body and a counterbored head integral therewith, the said head having a suitably disposed annular groove, internally thereof; with an axle having its end spaced somewhat apart from the face of the said head, the said axle comprising a shank, a cylindrical neck adjacent the shank, a terminal knob adjacent, and of larger diameter than, the neck, the end of the knob being adapted to bear against the inside of the head, and a plurality of balls adapted in conjunction with the said head and the said knob to retain the said wheel hub on the axle.

2. In combination, a wheel hub comprising a bored body and a counterbored head integral therewith, and said head having a suitably disposed annular groove, internally thereof; with an axle having its end spaced somewhat apart from the inside face of the said head, the said axle comprising a shank, a cylindrical neck adjacent the shank, a terminal knob adjacent, and of larger diameter than, the neck, the end of the knob being adapted to bear against the inside of the head, and a plurality of balls adapted in conjunction with the said head and the said knob to retain the said wheel hub on the axle, and means for allowing the introduction of the said balls into the said groove.

3. In a wheel hub and axle, having coacting ball-retaining grooves, the combination with the said hub, of a suitable plug removably held in a corresponding opening leading through the said hub into the said grooves; a protruding key suitably disposed in the said plug, and projections on the said hub adapted to engage the said protruding key for the purpose specified.

In testimony that I claim this invention as my own, I have signed this specification in the presence of two subscribing witnesses.

FREDERICK A. SWEET.

Witnesses:
G. S. PAYNE,
P. H. MALLINCKRODT.